United States Patent
Gupta et al.

(10) Patent No.: US 12,398,220 B2
(45) Date of Patent: Aug. 26, 2025

(54) CATALYST COMPOSITION AND A PROCESS FOR PREPARATION THEREOF

(71) Applicant: RELIANCE INDUSTRIES LIMITED, Mumbai (IN)

(72) Inventors: Virendra Kumar Gupta, Navi Mumbai (IN); Sangeetha Karthikeyan, Thane West (IN); Amarjyoti Kalita, Kamrup Pin (IN); Ajit Sapre, Mumbai (IN)

(73) Assignee: RELIANCE INDUSTRIES LIMITED, Mumbai (IN)

( * ) Notice: Subject to any disclaimer, the term of this patent is extended or adjusted under 35 U.S.C. 154(b) by 650 days.

(21) Appl. No.: 17/762,288

(22) PCT Filed: Nov. 18, 2020

(86) PCT No.: PCT/IB2020/060841
§ 371 (c)(1),
(2) Date: Mar. 21, 2022

(87) PCT Pub. No.: WO2021/099947
PCT Pub. Date: May 27, 2021

(65) Prior Publication Data
US 2022/0340692 A1 Oct. 27, 2022

(30) Foreign Application Priority Data
Nov. 23, 2019 (IN) .............................. 201921047915

(51) Int. Cl.
*C08F 4/6592* (2006.01)
*C08F 4/02* (2006.01)
*C08F 4/642* (2006.01)
*C08F 10/02* (2006.01)

(52) U.S. Cl.
CPC ............ *C08F 4/65925* (2013.01); *C08F 4/02* (2013.01); *C08F 4/6421* (2013.01); *C08F 10/02* (2013.01); *C08F 2410/01* (2013.01)

(58) Field of Classification Search
None
See application file for complete search history.

(56) References Cited

U.S. PATENT DOCUMENTS

| | | | |
|---|---|---|---|
| 4,302,565 A | 11/1981 | Goeke et al. | |
| 5,527,752 A | 6/1996 | Reichle et al. | |
| 7,989,549 B2 | 8/2011 | Zhou et al. | |
| 10,590,213 B2 * | 3/2020 | Rohatgi | C08F 8/00 |
| 2001/0049425 A1 * | 12/2001 | Waymouth | C08F 10/02 |
| | | | 526/170 |
| 2009/0318642 A1 | 12/2009 | Kokko et al. | |
| 2015/0011702 A1 * | 1/2015 | van den Esschert | C08F 10/00 |
| | | | 524/585 |

FOREIGN PATENT DOCUMENTS

| | | | |
|---|---|---|---|
| EP | 819706 B1 * | 11/2003 | .......... B01J 19/1837 |
| WO | 20130188950 A1 | 12/2013 | |
| WO | 2018026330 A1 | 2/2018 | |

OTHER PUBLICATIONS

International Search Report for PCT/IB2020/060841 Dated—Mailing Date—Feb. 16, 2021.
Written Opinion for PCT/IB2020/060841 Dated—Mailing Date—Feb. 16, 2021.

* cited by examiner

*Primary Examiner* — Satya B Sastri
(74) *Attorney, Agent, or Firm* — Gottlieb, Rackman & Reisman, PC

(57) ABSTRACT

The present disclosure relates to a catalyst composition and a process for preparation thereof. The catalyst composition of the present disclosure is stable, and produces polyolefin having narrow molecular weight distribution during the polymerization. The process of the present disclosure is simple, cost-effective, and rapid.

15 Claims, No Drawings

CATALYST COMPOSITION AND A PROCESS FOR PREPARATION THEREOF

FIELD

The present disclosure relates to a catalyst composition and a process for preparation thereof.

Definitions

As used in the present disclosure, the following terms are generally intended to have the meaning as set forth below, except to the extent that the context in which they are used indicate otherwise.

Metallocene complex: The term "metallocene complex" refers to a compound typically consisting of two cyclopentadienyl anions ($C_5H_5$, abbreviated Cp) bound/complexed to a metal center (M).

Ziegler Natta complex: The term "Ziegler Natta complex" refers to a complex of titanium compounds and co-catalysts (organoaluminum compounds such as tri-ethyl aluminium, $Al(C_2H_5)_3$).

BACKGROUND

The background information herein below relates to the present disclosure but is not necessarily prior art.

Ultrahigh molecular weight polyethylene (UHMWPE) is also known as high modulus PE or high performance PE due to its ultrahigh molecular weight. UHMWPE has excellent impact resistance, abrasion resistance, sliding properties and chemical resistance. UHMWPE is widely employed in mechanical fields, for example, it is used in bearings, pulleys, and as a lining for trucks or dock guards. In the medical field, UHMWPE plays a prominent role as the only material that meets the requirement for tibia-inlays in modern knee implants.

Ethylene monomers are polymerized in the presence of homogeneous and heterogeneous catalysts for manufacturing of UHMWPE. Homogeneous catalyst is used in cases where specific properties, such as very narrow molecular weight distribution, are required. Heterogeneous catalyst is used where specific properties, such as high molecular weight polymers and change in their morphological property, are required.

$MgCl_2$ and $SiO_2$ supported Ziegler-Natta catalysts and $SiO_2$ supported metallocene catalysts are typical catalysts used in current industrial processes.

Generally, in case of heterogeneous Ziegler Natta catalyst, fragmentation of the catalyst occurs during polymerization which directly affects the polymer morphology. The fragmentation occurs possibly due to the chemical reaction of the catalyst component, mechanical stress, and also polymer growth, respectively. At the early stage of polymerization, due to the high activity of polymerization, the polymer growth occurs at a faster rate in to the pores and the channel of the catalyst thereby fragmenting the catalyst. To control the morphology and fine generation, fragmentation of the catalyst must be controlled. The use of $SiO_2$ and $MgCl_2$ components of a solid support not only raises the activity of the catalyst, but also improves its morphology. $SiO_2$ also improves the mechanical and thermal stability of the catalyst. Due to the multi-site nature of the Ziegler-Natta type catalyst system, multiple active sites on catalyst particles result in uncontrolled morphology, and inconsistent particle size (e.g., a large span value) and undesired density of the polymer.

Further, metallocene catalysts offer an unprecedented control over polyolefin architecture. Metallocene catalysts are thought to be single site type catalysts, and consequently, by using metallocene, polymers have narrow molecular weight distribution and narrow chemical composition distributions, leading to improved mechanical properties including clarity, tear strength and stiffness. Furthermore, metallocene can be tailored to an almost limitless number of site types for a single monomer or monomer pair by varying: a) ligand type; b) bridge joining ligands; c) substituents on ligands and bridge to alter the steric and electronic surroundings of the active center; and d) transition metal type.

Polymers obtained from metallocene, due to their narrow molecular weight distributions, exhibit a distinct lack of shear thinning. Metallocene catalysts produce polymers with narrow molecular weight distribution (MWD) and lesser long chain branching. This characteristic has led to difficulties in processing using existing equipment. However, metallocene catalysts which have constrained geometry enable the production of long chain branches in polymer. These branches have been found to have significant influences on the rheological properties of the polymers. Long chain branching have been associated with increased low shear viscosities, enhanced shear thinning, elevated melt strengths, and increased elasticities aiding for better processability.

Therefore, there is, felt a need to develop a catalyst composition to mitigate the drawbacks mentioned hereinabove.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a catalyst composition.

Another object of the present disclosure is to provide a catalyst composition that is used in the polymerization reaction to obtain polyolefins having narrow molecular weight distribution.

Still another object of the present disclosure is to provide a polyolefin having high molecular weight and a polyolefin having low molecular weight.

Yet another object of the present disclosure is to provide a simple process for the preparation of a catalyst composition.

Other objects and advantages of the present disclosure will be more apparent from the following description, which is not intended to limit the scope of the present disclosure.

SUMMARY

The present disclosure relates to a catalyst composition represented by the following,

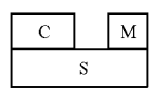

wherein, C is selected from a group of complexes consisting of a Ziegler Natta complex and a metallocene complex; M is a modifier selected from the group consisting of phosphonium bromobutyl ionomer, polyisobutylene, styrene butadiene vinylpropoxylate terpolymer, and polyether sulphone; and S is a support and is selected from the group consisting of silica and a combination of silica and magnesium dichloride.

In an embodiment, the catalyst composition comprises a Ziegler Natta complex, a modifier and a support. In one embodiment, the catalyst composition is a silica-magnesium supported Ziegler Natta complex containing modifier.

In another embodiment the catalyst composition of the present disclosure comprises a metallocene complex, a modifier, and a support. In one embodiment, the catalyst composition is a silica supported metallocene complex containing modifier.

The present disclosure further relates to a process for preparation of catalyst composition. In one embodiment, the present disclosure relates to a process for preparation of a silica-magnesium supported Ziegler Natta complex containing a modifier. In another embodiment, the present disclosure relates to a process for preparation of silica supported metallocene complex containing a modifier.

The present disclosure still further relates to a polyolefin obtained by the polymerization of an olefin using the catalyst composition of the present disclosure, wherein the polyolefin is characterized by having (i) molecular weight in the range of $22\times10^5$ g/mole to $33\times10^5$ g/mole and molecular weight distribution in the range of 4-7, when the catalyst composition comprises a Ziegler Natta complex, a support, and a modifier; and (ii) molecular weight in the range of $2\times10^5$ g/mole to $3\times10^5$ g/mole and molecular weight distribution in the range of 4.5-6.1, when the catalyst composition comprises a metallocene complex, a support and a modifier.

DETAILED DESCRIPTION

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third etc., when used herein do not imply a specific sequence or order unless clearly suggested by the present disclosure.

In an aspect, there is provided a catalyst composition. The catalyst composition of the present disclosure is represented by the following,

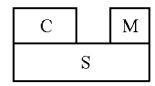

wherein, C is selected from a group of complexes consisting of a ziegler Natta complex and a metallocene complex; M is a modifier selected from the group consisting of phosphonium bromobutyl ionomer, polyisobutylene, styrene butadiene vinylpropoxylate ter polymer, and polyether sulphone; and S is a support and is selected from the group consisting of silica and a combination of silica and magnesium dichloride.

In an embodiment, the catalyst composition comprises a Ziegler Natta complex, a modifier and a support. In one embodiment, the catalyst composition is a silica-magnesium supported Ziegler Natta complex containing modifier.

In another embodiment the catalyst composition of the present disclosure comprises a metallocene complex, a modifier, and a support. In one embodiment, the catalyst composition is a silica supported metallocene complex containing modifier.

The Ziegler Natta complex is a complex of an alkyl aluminium compound and titanium halide. In an exemplary embodiment, the Ziegler Natta complex is a complex of triethyl aluminium and titanium trichloride.

The metallocene complex is Zirconocene, Titanocene, and Hafnocene. In an exemplary embodiment, the metallocene complex is Zirconocene.

In one embodiment, the catalyst composition of the present disclosure comprises a Ziegler Natta complex; at least one modifier selected from the group consisting of phosphonium bromobutyl ionomer, polyisobutylene, styrene butadiene vinylpropoxylate ter polymer, and polyether sulphone; and silica and magnesium dichloride as a support.

In another embodiment, the catalyst composition of the present disclosure comprises a metallocene complex; at least one modifier selected from the group consisting of phosphonium bromobutyl ionomer, polyisobutylene, styrene butadiene vinylpropoxylate terpolymer, and polyether sulphone; and silica as a support.

In accordance with the present disclosure, the amount of the modifier used in the catalyst composition of the present disclosure is in the range of 2 wt % to 10 wt % with respect to the total composition. In an embodiment, the amount of the modifier is 5 wt %.

The catalyst composition of the present disclosure is in the form of a free flowing powder, having a particle size in the range of 40 micron to 70 micron. In an embodiment, the particle size of the catalyst composition is 50 micron.

In another aspect, there is provided a process for preparation of the catalyst composition.

In accordance with one embodiment of the present disclosure there is provided a process for preparation of silica-magnesium supported Ziegler Natta complex containing modifier (modified silica-magnesium supported Ziegler Natta complex). The process is described in detail:

Firstly, a precursor solution is prepared by mixing magnesium chloride and titanium halide in a first fluid medium at a temperature in the range of 50-70° C. for a time period in the range of 2 hours to 4 hours. At the initial stage, the mixture is in the form of slurry, which gradually gets dissolved in the fluid medium with time. In an exemplary embodiment, magnesium chloride and titanium halide is mixed and dissolved in a first fluid medium at 65° C. for 3 hours to obtain clear solution. The clear solution is obtained after 3 hours of stirring which is called the precursor solution. The first fluid medium is tetrahydrofuran (THF).

Separately, slurry is prepared by mixing silica in a second fluid medium. An alkyl aluminium compound is added to the slurry at a temperature in the range of 40-50° C. for a time period in the range of 15 minutes to 60 minutes, followed by drying at a temperature in the range of 65-75° C. for a time period in the range of 1 hour to 3 hours under nitrogen to obtain a powder called teal on base (TOB). In an exemplary embodiment, silica is mixed in a second fluid medium to obtain slurry in which an alkyl aluminium compound is added at 45° C. for 30 minutes, followed by drying at 70° C. for 2 hours under nitrogen to obtain a powder called teal on base (TOB). The second fluid medium is hexane. The alkyl aluminum compound is triethylaluminum (TEAL)

The precursor solution is mixed with the powder at a temperature in the range of 40-50° C. under stirring and further stirred for a time period in the range of 15 minutes to 60 minutes to obtain a resultant slurry. In an exemplary embodiment, the precursor solution is mixed with the powder at 45° C. and stirred for 30 minutes.

The so obtained resultant slurry is dried at a temperature in the range of 50-70° C. for a time period in the range of 1 hour to 4 hours followed by cooling to obtain a first solid. In an exemplary embodiment, the resultant slurry is dried at 65° C. for 2 hours under nitrogen to obtain a first solid.

Further, the slurry of the first solid is prepared in a third fluid medium. To the slurry of the first solid, an alkyl aluminum compound is added at a temperature in the range of 25° C. to 45° C. for a time period in the range of 15 minutes to 60 minutes to obtain reaction mixture.

The third fluid medium is hexane. The alkyl aluminium compound is diethyl aluminum chloride (DEAC) and tri-n-hexyl aluminum.

In an exemplary embodiment, the slurry of first fluid medium is prepared under stirring and 10% diethyl aluminum chloride (DEAC) solution in hexane is added at 30° C., which is followed by dropwise addition of 46% tri-n-hexyl aluminum solution in oil 30° C. and stirred it for 30 minutes to obtain a reaction mixture.

After 30 minutes, the reaction mixture is dried at a temperature in the range of 50° C. to 70° C. for a time period in the range of 1 hour to 4 hours under nitrogen and cooling to obtain a second solid. In an exemplary embodiment, the reaction mixture is dried at 65° C. for 2 hours under nitrogen and cooling to obtain a second solid.

At least one modifier is added in the second solid under stirring at a temperature in the range of 25-40° C. for a time period in the range of 15 minutes to 60 minutes to obtain a product mixture. In an exemplary embodiment, the modifier is added in the second solid under stirring at 30° C. for 30 minutes to obtain a product mixture.

During the process, the modifier is added in the form of a solution which is prepared in a solvent selected from toluene and dichloromethane.

The product mixture is dried at a temperature in the range of 50° C. to 70° C. for a time period in the range of 15 minutes to 60 minutes to obtain the catalyst composition. In an exemplary embodiment, the product mixture is dried at 65° C. for 30 minutes to obtain the catalyst composition.

The catalyst composition of the present disclosure is in the form of a free flowing powder having particle size in the range of 40 micron to 70 micron.

In accordance with another embodiment of the present disclosure, there is provided a process for preparation of silica supported metallocene complex containing modifier (modified silica supported metallocene complex). The process is described in detail:

A slurry is prepared by heating a mixture of dehydrated silica and an alkyl alumoxane in a fluid medium at a temperature in the range of 80-95° C. for a time period in the range of 1 hour to 4 hours under stirring. The slurry is cooled to room temperature.

The fluid medium is toluene and the alkyl alumoxane is methyl alumoxane. In an exemplary embodiment, the dehydrated silica and an alkyl alumoxane is mixed in the fluid medium and heated at 90° C. for 3 hours under stirring to obtain slurry.

The fluid medium is removed from the slurry under nitrogen at a temperature in the range of 40-60° C. to obtain a solid. In an exemplary embodiment, the fluid medium is removed from the slurry under nitrogen at 50° C. to obtain a solid.

A metallocene complex is added to the solid under stirring to obtain a reaction mixture. In an embodiment, a solution of metallocene complex is prepared in a fluid medium and added drop wise in the reaction mixture. The fluid medium is dry toluene. In an embodiment, stirring is carried out for 1 hour to obtain the reaction mixture.

The metallocene complex is selected from Zirconocene, Titanocene, and Hafnocene. In an exemplary embodiment, the metallocene complex is Zirconocene.

At least one modifier is added to the reaction mixture under stirring at a temperature in the range of 30-50° C. for a time period in the range of 0.5 hour to 2 hours to obtain a product mixture.

The modifier is added in the form of a solution which is prepared in a solvent selected from toluene and dichloromethane.

In an exemplary embodiment, the modifier is added to the reaction mixture under stirring at 40° C. for 1 hour to obtain a product mixture.

The fluid medium is removed from the product mixture to obtain said catalyst composition. In an exemplary embodiment, the fluid medium/volatiles are removed from the product mixture under nitrogen flow at 40° C. to obtain the catalyst composition.

The catalyst composition of the present disclosure is in the form of a free flowing powder having particle size in the range of 40 micron to 70 micron.

In still another aspect, there is provided a polyolefin having desired properties.

In one embodiment, the polyolefin obtained by the polymerization of an olefin using the catalyst composition (silica-magnesium supported Ziegler Natta complex containing modifier) of the present disclosure is characterized by having molecular weight in the range of $22 \times 10^5$ g/mole to $33 \times 10^5$ g/mole and molecular weight distribution in the range of 4-7.

In another embodiment, the polyolefin obtained by the polymerization of an olefin using the catalyst composition (silica supported metallocene complex containing modifier) of the present disclosure is characterized by having a molecular weight in the range of $2 \times 10^5$ g/mole to $3 \times 10^5$ g/mole and molecular weight distribution in the range of 4.5-6.1.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Experiment

Example 1a: Synthesis of Polymer/Ionic Molecule Modified Silica Supported Zirconocene Catalyst System To 4 g of silica, Sylopol 948 (W. R. Grace) dehydrated at 600° C.; 20 mL of 10 wt % methylalumoxane in 25 mL of dried toluene was added to obtain slurry. The slurry was heated to 90° C. for 3 h. Then, volatiles were removed by nitrogen flow and by application of mild heat 50° C. to obtain a solid.

170 mg of (1-nBu-3-methyl) biscyclopentadienyl zirconium dichloride in 25 mL of dried toluene was added dropwise with stirring to the solid to obtain slurry. The stirring was continued for 1 h to obtain a reaction mixture.

306 mg of SBR terpolymer (2 to 5×10$^5$, g/mole) was dissolved in 100 mL of toluene by stirring for 2 h to obtain SBr terpolymer solution. The SBr terpolymer solution was added to the reaction mixture and stirred for 1 hr at 40° C. Then solvent is removed by the nitrogen flow at 40° C. to obtain the free flowing catalyst powder.

Examples 1b-1d

Examples 1b-1d were carried out by using the similar procedure as described in Example 1a, except the use of different modifiers, as given below:
Example 1b—phosphonium bromobutyl ionomer as a modifier;
Example 1c—poly isobutylene as a modifier;
Example 1d—polyether sulphone as a modifier Example 1e—Comparative Example: Synthesis of Unmodified Supported Zirconocene Catalyst System To 4 g of silica, Sylopol 948 (W. R. Grace) dehydrated at 600° C., was added 20 mL of 10 wt % methylalumoxane in toluene and 25 mL of dried toluene. The slurry was heated to 90° C. for 3 h. Then, volatiles were removed by nitrogen flow and by application of mild heat 50° C. 170 mg of (1-nBu-3-methyl) bis cyclopentadienyl zirconium dichloride in 25 mL of dried toluene is added dropwise with stirring. The stirring is continued for 1 h and volatiles removed by nitrogen flow at 40° C. to get the free flowing catalyst powder.

TABLE 1

Characterization of modified and unmodified Zirconocene catalysts

| Catalyst according to example: | 1-a | 1-b | 1-c | 1-d | 1-e Comparative Example (unmodified Zirconocene catalyst) |
|---|---|---|---|---|---|
| Zr wt % | 0.55 | 0.6 | 0.6 | 0.6 | 0.5 |
| Al wt % | 12.3 | 16.2 | 16.1 | 15.6 | 14.5 |
| Surface Area, m$^2$/g | 295 | 206 | 326 | 362 | 263 |
| Pore volume, cc/g | 0.74 | 0.79 | 1.36 | 0.93 | 0.91 |
| Average Pore Radius, Å | 76.42 | 76.34 | 83.68 | 51.49 | 69.91 |
| Particle size distribution PSD (D50, μ) | 55 | 52 | 32 | 57 | 49 |

Table 1 depicts the characteristics of the modified Zirconocene catalyst as compared to unmodified Zirconocene catalyst. The characteristics of the modified catalysts (1a-1d) are based on the different modifiers used during the preparation of the catalyst composition. The catalyst composition as disclosed in 1c has relatively better physical properties.

Example 1f: Olefin Polymerization Using Modified Metallocene Zirconocene Catalyst System The polymerization was conducted in a bench scale gas phase reactor. PE pellets were used as seed bed. Triisobutyl aluminium (TIBAL) was used as scavenger. The ethylene feed was purified by passing through adsorbent beds before injecting into the reactor. Homopolymerization of ethylene and copolymerization of ethylene with 1-hexene as comonomer was performed. The solid catalyst of the present disclosure was injected into reactor using nitrogen as carrier. The polymerization was carried out at 80° C. temperature and 14.0 bar pressure (partial pressure of ethylene—10 bar). Polymerization process parameters are listed in table 1 below. Molecular weight and polydispersity index (PDI) was calculated using Gel Permeation Chromatography (GPC) which are summarized in the table 2 below.

TABLE 2

Polymerization process parameters

| | Homo polymerization of ethylene (partial pressure - 10 bar) | | | | Copolymerization | | | |
|---|---|---|---|---|---|---|---|---|
| | | | | | Hexane | | | |
| Catalyst according to example: | catalyst wt, g | Polymer wt, g | Productivity gPE/gcat | m. pt° C. | amount, mL | Polymer wt, g | Productivity (gPE/gcat) | m. pt° C. |
| 1-a | 0.2 | 10 | 50 | 134 | 8 | 20 | 10 | 119 |
| 1-b | 0.2 | 11.5 | 57.5 | 133 | 8 | 12 | 60 | 118 |
| 1-c | 0.2 | 18 | 90 | 134 | 8 | 17 | 85 | 120 |

TABLE 2-continued

| | Polymerization process parameters | | | | | | | |
|---|---|---|---|---|---|---|---|---|
| | Homo polymerization of ethylene | | | | Copolymerization | | | |
| Catalyst | (partial pressure - 10 bar) | | | | Hexane | | | |
| according to example: | catalyst wt, g | Polymer wt, g | Productivity gPE/gcat | m. pt° C. | amount, mL | Polymer wt, g | Productivity (gPE/gcat) | m. pt° C. |
| 1-d | 0.2 | 16 | 80 | 132 | 8 | 5 | 25 | 120 |
| Comparative Example 1-e | 0.2 | 35 | 175 | 134 | 8 | 30 | 180 | 118 |

It is inferred from Table 2 that the polymerization performance of the modified catalysts are lesser than the unmodified (comparative example 1-e) due to the effect of the modifier added. However, the performance of the catalyst can be improved by increasing the concentration of the active ingredient. These experiments give a novel route of synthesizing a polymer with broad MWD from the Zirconocene which are conventionally known for producing polymer with narrow MWD

TABLE-3

Molecular weight and polydispersity index (PDI) characterization of copolymers:

| Catalyst according to example: | 1-a | 1-b | 1-c | 1-d | Comparative Example- Unmodified catalyst composition |
|---|---|---|---|---|---|
| Molecular weight, g/mol, in lacs | 3.1 | 1.9 | 2.1 | 3.0 | 1.7 |
| PDI | 4.4 | 6.1 | 3.9 | 3.8 | 2.9 |
| Comonomer content | 6.1 | 10.5 | 10.2 | 4.1 | 6.5 |

As shown in Table-3, modification of metallocene catalyst system with the modifiers disclosed in the present disclosure leads to broadening of molecular weight distribution as evidenced by PDI numbers. PDI of copolymers produced by modified metallocene catalyst composition disclosed in the present disclosure is higher than the PDI of copolymers produced by the unmodified metallocene catalyst system.

Example 2

Example 2a: Synthesis of Polymer/Ionic Molecule Modified Zeigler Natta Catalyst System 10 gm De-hydroxylated silica (955D) was added to 100 mL dry hexane in 1 L jacketed glass reactor. Then 7.5 ml TEAL (10%) was added at 45° C. and stirred for 30 mins, followed by drying at 70° C. under nitrogen for 2 hrs. The product of this step was a free flowing powder called as Teal on Base (TOB). In another 0.5 L reactor, 1.08 gm MgCl₂ and 0.75 gm TiCl₃ were dissolved in dry 100 ml THF at 65° C. for 3 hrs, resulting in precursor solution. Initially this raw material, forms slurry and it gets gradually dissolved in THF with time. After 3 hrs, a transparent solution is obtained, called as precursor solution. 100.5 ml of the precursor solution, is then transferred under nitrogen pressure to the another reactor containing TOB (which is maintained at 45° C.). The resultant slurry is the stirred for 30 mins, followed by drying at 65° C. under nitrogen for 2 hrs, resulting in a solid. Then dry 100 ml hexane is added to the dry solid and stirred for 10 min and 17.8 ml added 10% diethyl aluminum chloride (DEAC) solution in hexane at 30° C. It is followed by drop wise addition of 6 ml of 46% tri-n-hexyl aluminum solution in oil. This reaction step is carried out at 30° C. for 30 min, followed by drying at 65° C. under nitrogen for 2 hrs. After the drying, solution of SBR tar polymer (5 wt %) in 100 ml toluene is transferred to the dry catalyst and stirred at 30° C. for 30 minutes followed by drying at 65° C. under nitrogen.

Examples 2b-2c

Example 2b-2c were carried out by using the similar procedure as described in Example 2a, except the use of different modifiers.

Example 2b—Phosphonium ionomer as a modifier; and
Example 2c—polyether sulphone as a modifier

TABLE-4

Characterization of unmodified and modified silica magnesium supported Zeigler Natta

| Catalyst system according to example: | Ti (wt %) | Mg (wt %) | Particle size distribution PSD (micron) | THF (%) |
|---|---|---|---|---|
| Unmodified ZN | 0.93 | 1.7 | 51 | 12 |
| 2a | 0.81 | 1.8 | 60 | 5 |
| 2b | 0.94 | 1.7 | 45 | 7 |
| 2c | 0.85 | 1.4 | 45 | 7 |

In Table 4, the composition and particle size of the catalyst is tabulated. The titanium content of the catalyst is found in the range of 0.81-0.93 wt % and the magnesium content is found in the range of 1.4-1.8 wt %. The average particle size of the catalyst is in the range of 45-60 micron.

Example 2d: Olefin Polymerization Using Modified Zeigler Natta Catalyst System

Ethylene polymerization was performed in a 4 L SS reactor equipped with a stirrer, temperature, and pressure indicator, feeding line for catalyst, ethylene, and nitrogen. The 1 ml triethyl aluminium was served as a moisture scavenger. Hexane (1.75 lit) was transferred to the reactor from burette using nitrogen pressure.

1 ml amount of tri ethyl aluminium was then added for pre-killing the moisture in the solvent. Agitation (at 400 rpm) is then set on, followed by saturation of solvent with ethylene up to 2 bar pressure. After that, 50 mg dry catalyst was injected under high pressure nitrogen. The desired amount of hydrogen (0, 3, 5 bar, as given in Table 5) was then charged to the reactor through high pressure charging bomb/vessel. Under continuous stirring, the ethylene pressure was maintained at 8.6 bar for a predetermined time (1 h). At the end of that time the reactor was depressurized and the temperature was dropped to 30° C. The recovered polymer was dried at vacuum oven at 40° C.

A set of experiments were carried out in the presence of hydrogen to investigate the effect of chain transfer agent on the properties of the end polymer resins. Hydrogen is known as one of the most effective chain transfer agents. In this process, hydrogen was added to investigate the effect on polymerization behavior. The catalyst properties and properties of polyethylene produced using modified and unmodified catalyst system by polymerization are shown in Table 5.

TABLE 5

Characterization of unmodified and modified Zeigler Natta catalyst systems and polyethylene obtained.

| Catalyst according to example | Hydrogen (bar) | Activity (kg/gm cat) | BD (T) | MFI (g/10 min) | Mv (Lakh) g/mol | MWD |
|---|---|---|---|---|---|---|
| Unmodified ZN | 0 | 12 | 0.25 | — | 18 | — |
| | 3 | 10 | 0.28 | 0.24 | 7.4 | — |
| | 5 | 7 | 0.29 | 0.8 | 2.5 | 6.6 |
| 2-a | 0 | 2.6 | 0.18 | — | 33 | — |
| | 3 | 1.5 | 0.21 | 0.3 | 8.5 | — |
| | 5 | 1.2 | 0.24 | 0.7 | 5.2 | 6.6 |
| 2-b | 0 | 10 | 0.33 | — | 20 | — |
| | 3 | 5.6 | 0.34 | 0.1 | 8.3 | — |
| | 5 | 4.5 | 0.35 | 0.4 | 5.5 | 5.5 |
| 2-c | 0 | 8.5 | 0.24 | — | 21 | — |
| | 3 | 5.6 | 0.28 | 0.2 | 10 | — |
| | 5 | 4.6 | 0.29 | 0.5 | 5.1 | 4.7 |

As observed in Table-5, molecular weight distribution of the polyethylene obtained using the catalyst system prepared according to example 2-b and 2-c have narrow molecular distribution as compared to the polyethylene obtained using unmodified Zeigler Natta catalyst system.

The molecular weight of polyethylene as produced with ZN catalyst 2-a, is found ~54% higher as compare to polyethylene produced with un-modified ZN catalyst system.

The MWD of the polyethylene resin as produced by the modified catalyst system (catalyst 2-c) shows narrow (MWD=4.7) as compared to non-modified catalyst system (MWD=6.6). Due to the presence of the bulkier group into the backbone of modifier, it influences the steric and electronic environment onto the catalytic moieties. The activity of the modified catalyst system is lower as compared to the un-modified catalyst system, due to the steric effect of the modifier. Interestingly, from the GPC chromatograph it is observed the modified catalyst system produce less, low and high molecular weight fraction polyethylene resin as compared to the unmodified catalyst system. So, MWD of the polyethylene resin is narrow as compared to the unmodified catalyst system.

The activity of all catalyst systems decreased gradually as the amount of hydrogen introduced increased as the metal hydride is generated from a chain transfer to hydrogen or β-hydrogen elimination. In the course of reactivation of this hydride complex, hydrogen might coordinate to the metal atom in competition with an ethylene monomer and stabilize it. Therefore, the total propagation rate becomes lower, which results in lower polymerization activity. The MW of polyethylene also decreased gradually with the addition of hydrogen in all catalyst systems, which clearly indicate that, the added hydrogen acted as an effective chain transfer agent. With increasing hydrogen concentration, the chain transfer taking place at a faster rate to produce medium molecular weight resin.

Therefore, it is concluded that the catalyst composition of the present disclosure provides the polymer with the desired molecular weight distribution.

TECHNICAL ADVANCEMENTS

The present disclosure described herein above has several technical advantages including, but not limited to, the realization of
 a simple process for the preparation of catalyst composition;
 provides a stable catalyst composition; and
 provides polyolefin with narrow molecular weight distribution.

The embodiments as described herein above, and various features and advantageous details thereof are explained with reference to the non-limiting embodiments in the following description.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The foregoing description of specific embodiments so fully reveal the general nature of the embodiments herein, that others can, by applying current knowledge, readily modify and/or adapt for various applications of such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein. Further, it is to be distinctly understood that the foregoing descriptive matter is to be interpreted merely as illustrative of the disclosure and not as a limitation.

Having described and illustrated the principles of the present disclosure with reference to the described embodiments, it will be recognized that the described embodiments can be modified in arrangement and detail without departing from the scope of such principles.

While considerable emphasis has been placed herein on the particular features of this disclosure, it will be appreciated that various modifications can be made, and that many changes can be made in the preferred embodiment without departing from the principles of the disclosure. These and other modifications in the nature of the disclosure or the preferred embodiments will be apparent to those skilled in the art from the disclosure herein, whereby it is to be distinctly understood that the foregoing descriptive matter is to be interpreted merely as illustrative of the disclosure and not as a limitation.

The invention claimed is:

1. A catalyst composition comprising:
  i. a Ziegler Natta complex, a modifier and a combination of silica-magnesium dichloride support; or
  ii. a metallocene complex, a modifier and a silica support;

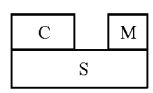

wherein,
said modifier is selected from the group consisting of phosphonium bromobutyl ionomer, polyisobutylene, styrene butadiene vinylpropoxylate terpolymer, and polyether sulphone; and
wherein the amount of said modifier is in the range of 2 wt % to 10 wt % with respect to the total composition.

2. The catalyst composition as claimed in claim 1, wherein said Ziegler Natta complex is a complex of alkyl aluminium compound and titanium halide.

3. The catalyst composition as claimed in claim 1, wherein said Ziegler Natta complex is a complex of triethyl aluminium and titanium trichloride.

4. The catalyst composition as claimed in claim 1, wherein said metallocene complex is selected from zirconocene, titanocene, and hafnocene.

5. The catalyst composition as claimed in claim 1, comprising:
   a. Ziegler Natta complex;
   b. at least one modifier selected from the group consisting of phosphonium bromobutyl ionomer, polyisobutylene, styrene butadiene vinylpropoxylate terpolymer, and polyether sulphone; and
   c. silica and magnesium dichloride as a support.

6. The catalyst composition as claimed in claim 1, comprising:
   a. a metallocene complex;
   b. at least one modifier selected from the group consisting of phosphonium bromobutyl ionomer, polyisobutylene, styrene butadiene vinylpropoxylate terpolymer, and polyether sulphone; and
   c. silica support.

7. The catalyst composition as claimed in claim 1, wherein the amount of said modifier is 5 wt % with respect to the total composition.

8. The catalyst composition as claimed in claim 1, wherein said catalyst composition is in the form of a free flowing powder, having particle size in the range of 40 micron to 70 micron.

9. A process for preparing a silica-magnesium chloride supported Ziegler Natta complex containing modifier as claimed in claim 5, said process comprising the following steps:
   (i) preparing a precursor solution by contacting magnesium chloride with titanium halide in a first fluid medium at a temperature in the range of 50-70° C. for a time period in the range of 2 hours to 4 hours;
   (ii) separately preparing a slurry by contacting silica in a second fluid medium and adding an alkyl aluminium compound to said slurry at a temperature in the range of 40-50° C. for a time period in the range of 15 minutes to 60 minutes, followed by drying to obtain a powder;
   (iii) mixing said precursor solution and said powder at a temperature in the range of 40-50° C. and stirring for a time period in the range of 15 minutes to 60 minutes to obtain a reaction mixture;
   (iv) drying said reaction mixture at a temperature in the range of 50° C. to 70° C. for a time period in the range of 1 hour to 4 hours and cooling to obtain a first solid;
   (v) preparing a slurry of said first solid in a third fluid medium and adding alkyl aluminum compound at a temperature in the range of 25° C. to 45° C. for a time period in the range of 15 minutes to 60 minutes to obtain a resultant mixture;
   (vi) drying said reaction mixture at a temperature in the range of 50° C. to 70° C. for a time period in the range of 1 hour to 4 hours and cooling to obtain a second solid;
   (vii) adding at least one modifier in said second solid under stirring at a temperature in the range of 25-40° C. for a time period in the range of 15 minutes to 60 minutes to obtain a product mixture; and
   (viii) drying said product mixture at a temperature in the range of 50° C. to 70° C. for a time period in the range of 15 minutes to 60 minutes to obtain said catalyst composition;
   wherein, said catalyst composition is in the form of a free flowing powder.

10. The process as claimed in claim 9, wherein said modifier is added in the form of a solution prepared in a solvent selected from toluene and dichloromethane.

11. The process as claimed in claim 9, wherein said first fluid medium is tetrahydrofuran and said second fluid medium and said third fluid medium is hexane.

12. A process for preparing a silica supported metallocene complex containing modifier as claimed in claim 7, said process comprising the following steps:
   a. preparing a slurry by heating a mixture of dehydrated silica and an alkyl alumoxane in a fluid medium at a temperature in the range of 80-95° C. for a time period 1 hour to 4 hours under stirring;
   b. partially removing the fluid medium from said slurry followed by cooling it to a temperature in the range of 40-60° C. to obtain a solid;
   c. adding a metallocene complex in a fluid medium to said solid, under stirring for a time period in the range of 0.5 hour to 2 hours to obtain a reaction mixture;
   d. adding at least one modifier in said reaction mixture, under stirring at a temperature in the range of 30-50° C. for a time period in the range of 0.5 hour to 2 hours to obtain a product mixture; and
   e. removing the fluid medium from the product mixture to obtain said catalyst composition;
   wherein, said catalyst composition is in the form of a free flowing powder.

13. The process as claimed in claim 12, wherein said modifier is added in the form of a solution prepared in a solvent selected from toluene and dichloromethane.

14. The process as claimed in claim 12, wherein said fluid medium is toluene.

15. The process as claimed in claim 12, wherein said alkyl alumoxane is methyl alumoxane.

* * * * *